`United States Patent` [19]

Wilson et al.

[11] Patent Number: 4,957,636

[45] Date of Patent: Sep. 18, 1990

[54] DEVICE FOR SKIMMING OIL FROM WATER

[75] Inventors: Donald L. Wilson, Crossville, Ill.; Jerry C. Trippe, Fairfax Station, Va.

[73] Assignee: General Technology Applications, Inc., Manassas, Va.

[21] Appl. No.: 413,084

[22] Filed: Sep. 27, 1989

[51] Int. Cl.$^5$ ............................................. E02B 15/04
[52] U.S. Cl. .................................. 210/242.3; 210/923
[58] Field of Search .................. 210/242.3, 242.4, 923, 210/924

[56] References Cited

U.S. PATENT DOCUMENTS

| | | | |
|---|---|---|---|
| 1,379,176 | 5/1921 | Foster | 210/923 |
| 1,860,819 | 5/1932 | Schamberger | 210/923 |
| 3,539,508 | 11/1970 | Bulkley et al. | 210/242.4 |
| 3,612,277 | 10/1971 | Van Stavern et al. | 210/242.3 |
| 3,617,556 | 11/1971 | Cole et al. | 210/242.4 |
| 4,315,818 | 2/1982 | Thomas | 210/242.3 |
| 4,456,536 | 6/1984 | Lorenz et al. | 210/776 |
| 4,514,299 | 4/1985 | Ayroldi | 210/242.3 |
| 4,557,832 | 12/1985 | Verboom | 210/242.3 |
| 4,681,680 | 7/1987 | Delons et al. | 210/110 |

Primary Examiner—Richard V. Fisher
Assistant Examiner—Christopher Upton
Attorney, Agent, or Firm—Roland H. Shubert

[57] ABSTRACT

A dual drum skimmer is provided for the removal and recovery of oil floating on water. The skimmer includes two oil pick-up drums arranged along a common axis which pick up oil and deposit it in a collection trough. Oil deposited in the collection trough is directed to a reservoir trough arranged on the opposite side of the drums from the collection trough. The drums are formed as hollow, closed cylinders and, together with the reservoir trough, provide the total buoyancy necessary to float the skimmer. The skimmer is particularly effective in shallow and in trash laden water and can operate in water depths of as little as three inches.

12 Claims, 2 Drawing Sheets

DEVICE FOR SKIMMING OIL FROM WATER

BACKGROUND OF THE INVENTION

1. Field of the Invention:

This invention relates generally to devices for skimming oil from the surface of water.

More specifically, this invention relates to a dual drum skimmer having a very high oil pick-up rate and adapted for operation in extremely shallow and in trash-laden water.

2. Description of Related Art:

Spills of hydrocarbons into bodies of water are a common occurrence during the production of crude oil and the transport of crude oil and of refined hydrocarbon products. Ordinarily, efforts are made to limit the spread of the spilled hydrocarbons by encircling the spill area with booms and to then recover as much of the hydrocarbon liquids as is possible using a variety of skimming devices such as weir skimmers, disc skimmers, and mop skimmers.

A weir skimmer typically comprises a barrier wall of adjustable height which allows oil floating on water to flow over the wall and into a collection trough while excluding water. Recovered oil is then continuously pumped from the collection trough to a storage or transport means. Weir skimmers operate well in calm water with large or contained spills which produce a relatively thick oil layer.

Disc skimmers ordinarily include a plurality of discs spaced apart coaxially along a rotating shaft which is supported by floats to position the lower portion of the discs in the water. Oil contacts and adheres to the rotating discs and is removed by blades or wipers which direct the collected oil into a sump or other collection means.

A mop skimmer, or rope skimmer, is arranged to contact the oil film with an absorbent or filamentous member to which the oil clings. The oil-heavy member is then passed between rollers which squeeze out and collect the oil.

Those various skimming devices are ordinarily employed on spills occurring in open water. Spills on land, where liquid hydrocarbons often end up in small streams, drainage ditches, and the like present very different problems. Water bodies which are contaminated by land spills typically are shallow and usually are trash covered. The skimmers of traditional design have limited use at best in such circumstances and are seldom employed. Rather, use is made of absorbents to soak up oily liquids and of vacuum trucks to pick up oils from the water surface by suction means. Use of absorbents results in the production of large volumes of oily wastes which require disposal while vacuum collection methods usually results in the collection of large amounts of water with the oil.

Drum skimmers have also been used for the removal of oil and other hydrocarbons from water surfaces. A drum skimmer consists of one or more large rollers, or drums, which rotate partly submerged in water. Oil attaches to the drum surface as the drum rotates through the oil-water interface. The attached oil is then removed by squeezing or scrapping the oil from the drum surface. One early example of such a device is shown in the Schamberger patent, U.S. Pat. No. 1,860,819. The Schamberger device utilizes two closely spaced rollers turning in opposite directions. In operation, the rollers are adjusted to dip beneath the surface of a water channel containing floating oil and are rotated in such a direction as to pull the oil film under the roller. The oil film transfers to the roller surface and is carried around the roller to the back side therof where it is scraped off by a stationary blade and directed into a trough for recovery.

Later, Van Stavern et al. in U.S. Pat. No. 3,612,277, disclosed a tandum drum arrangement in which one drum was partly submerged in water while the second, and smaller, drum was placed above the water surface and at a close, critical spacing from the first drum. Oil picked up by rotation of the first drum was then transferred in part to the second drum. Doctor blades were located on the back side of each drum to scape oil from the drum surfaces and into collection troughs. That arrangement, using one drum or roller to pick up oil from the water surface and the other roller to transfer a portion of the oil from the surface of the first roller to that of the second, was said to have the advantage of reducing the amount of water collected with the oil.

A patent to Thomas, U.S. Pat. No. 4,315,818, describes another type of drum skimmer adapted to pick up heavy fuel oils and the weathered, emulsified residue of an oil spill commonly called "mousse". The Thomas device employs a large pickup drum having corrugations in the form of gear teeth extending across the drum surface. A second, smaller drum having gear teeth meshing with those of the first drum is arranged to drive the larger drum and to squeeze out oil for recovery in a collector positioned beneath the small drum.

Another type of drum skimmer is described in U.S. Pat. No. 4,681,680 to Delons et al. The skimmer includes means for pulling an oil film floating on the surface of water into contact with a rotating drum which is partially immersed in the water. A housing encloses the rear and bottom of the drum and a propeller is located to draw water into the housing and across the bottom of the drum thus continuously transporting an oil film into contact with the drum.

As with the other types of oil skimmers, none of the present drum skimmers known in the art can operate well in shallow water or in water bodies which are trash laden. Other approaches to the collection of oil from water, as for example vacuum suction means, are readily plugged by trash pulled to the suction nozzle.

SUMMARY OF THE INVENTION

According to this invention, there is provided a dual drum skimmer device for removing oil floating on water. Two relatively large diameter drums are mounted on a frame and arranged to rotate about a common axis. A collection trough, which forms the front of the frame, receives oil scraped from the rotating drums. Collected oil is passed to a reservoir trough, which forms the back of the frame, through channels between the two drums and at the drum ends. The reservoir trough and the drums are sized to provide all of the buoyancy necessary to float the device and are proportioned so as to position the skimmer in an effective, oil gathering attitude. Motive means, which preferably comprise an air motor driving a speed reducer, are provided to rotate the drums in a direction which draws floating oil backwardly beneath the drums. Oil is removed from the reservoir trough through a conduit which may be a hose connected to a vacuum truck.

Hence, it is an object of this invention to provide a skimming device which is effective to remove oil from shallow waters.

It is another object of this invention to provide high capacity oil skimming means which can be moved and positioned by one man.

Another object of this invention is to provide means for the removal of oil from water in the presence of floating trash.

Other objects of this invention will become evident from the following description of illustrative and preferred embodiments of the invention.

BRIEF DESCRIPTION OF THE DRAWINGS

Specific embodiments of the invention are illustrated by the drawings in which.

DESCRIPTION AND DISCUSSION OF THE INVENTION

Figure 1:
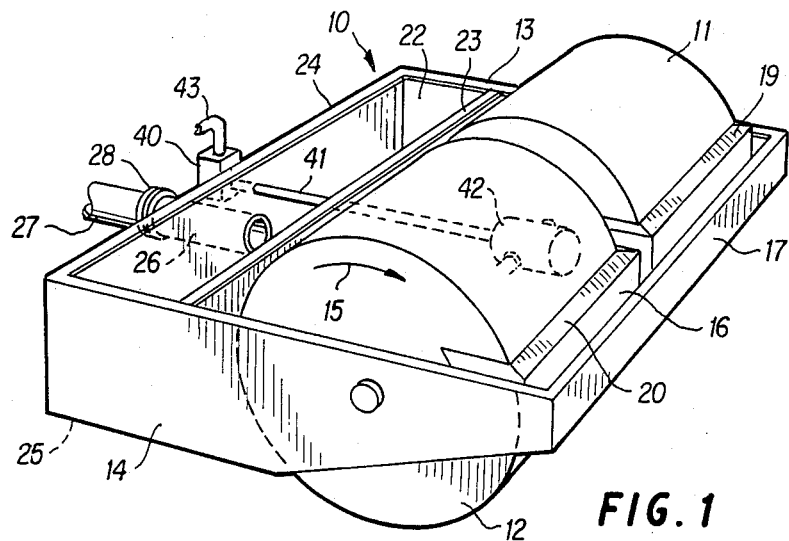
FIG. 1 is a perspective view of a skimmer device constructed in accordance with the present invention.

With reference now to FIG. 1 of the drawing, the skimmer device of this invention includes a frame 10 of generally rectangular configuration having two drums, 11 and 12, mounted thereon. The drums are spaced a small distance apart along a common axis, are necessarily of equal diameter, and preferably of equal length as well, and are constructed as hollow, closed cylinders. The drums may be constructed of any suitable material but plastics are preferred because of their combination of desirable properties including light weight, oil wettability, and corrosion resistance. Polyolefins including polyethylene and polypropylene are are among the preferred plastics and the drums may be fabricated by blow molding techniques. The drums are mounted in the frame between frame side members 13 and 14 with their common axis of rotation parallel to the front frame member and are arranged for rotation in the direction indicated by arrow 15.

A collection trough 16 having a forward wall 17 extends the full length of drums 11 and 12 and forms the front frame member. The collection trough is open-topped, has two rear wall portions, each adjacent to and extending along the length of one of the drums and topped with scraper or doctor blades 19 and 20 which bear against the cylindrical wall surface of drums 11 and 12 respectively. The doctor blades remove oil adhering to the drum surfaces and direct the oil into the collection trough 16. The back of the frame 10 is formed by open-topped reservoir trough 22 which has a forward wall 23, a rear wall 24 and a generally flat bottom member 25. Means are provided to remove fluid from the reservoir trough. Such means appropriately comprise a nipple 26 communicating with the interior of trough 22 through its rear wall 24 at a central point adjacent the trough bottom. Nipple 26 is arranged for connection to a hose 27 or other, preferably flexible, conduit means through coupling 28 which may be a quick-disconnect fitting.

Figure 2:
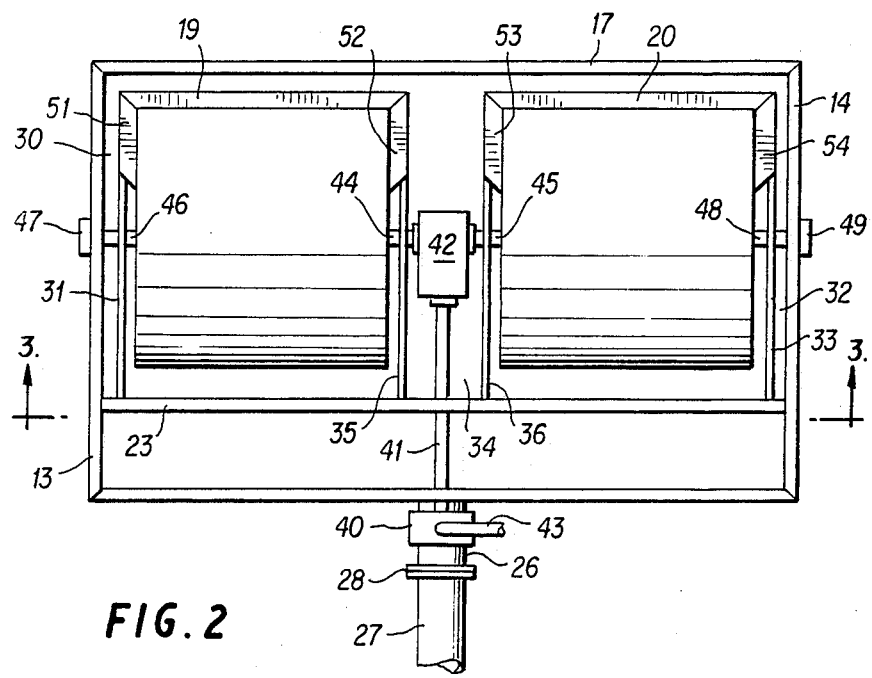
FIG. 2 is a plan view of the device represented in FIG. 1.
Figure 3:
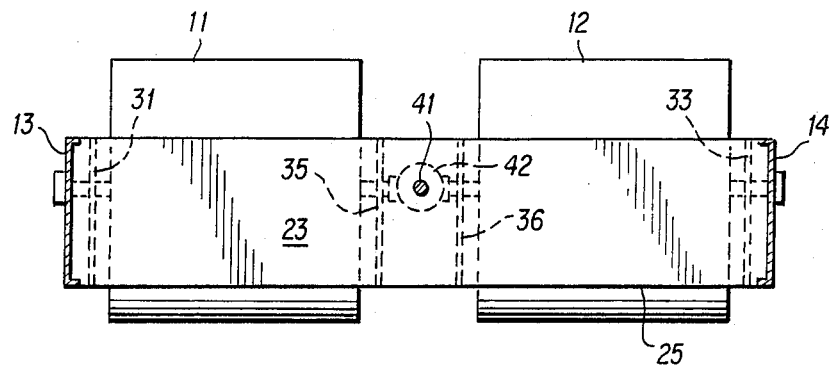
FIG. 3 is a section taken along the line 3–3' of FIG. 2.

As is best illustrated in FIG. 2, multiple channel means are provided between the collection trough 16 and the reservoir trough 22. A first open-topped, generally U-shaped channel 30 is located at the outer end of drum 11 and is formed by frame side member 13 and parallel inner channel wall 31 which extends from the rear wall portion of collector trough 16 to the forward wall 23 of the reservoir trough. The bottom of channel 30 is preferably coextensive with the bottom of reservoir trough 22. In similar fashion, a second channel 32 is located between the outer end of drum 13 and is formed by frame side member 14 and parallel inner channel wall 33. A third channel 34 having parallel wall members 35 and 36 is located between the two drums. As is shown in FIG. 3 which is a section taken along the plane of forward wall 23, openings are provided through wall 23 conforming in size and shape to channels 30, 32 and 34.

Referring once again to FIG. 2, there is provided motive means to rotatably drive the drums in the direction of arrow 15 of FIG. 1. Those motive means preferably include a drive motor 40 turning an input shaft 41 of speed reducer 42. It is required that motor 40 be of a kind which is safe in an explosive atmosphere as hydrocarbon spills occasionally contain a sufficient quantity of volatile components as to constitute a fire or explosion hazard. For this reason, and also because of the ease of speed control, it is preferred that motor 40 be an air motor powered by pressurized air supplied through hose 43. The total power required to drive the drums is modest; less than 1 horsepower, so a very light weight air motor is adequate. Speed reducer 42 may conveniently be of the worm wheel type having two output shafts 44 and 45 at right angles to the input shaft and is mounted between drums 11 and 12 above channel 34. Shaft 44 is arranged to rotatably drive drum 11 which, at its other end, has an axle 46 journeled at 47 in frame side member 13. In similar fashion, output shaft 45 drives drum 12 which likewise has an axle 48 at its other end journeled at 49 in frame side member 14. Among other advantages, location of the motive means centrally between the two drums balances the skimmer and maintains the two drums at an equal working depth without counterweights or supplemental flotation means.

There is also provided a pair of drum end scraper or doctor blades for each drum. Blades 51 and 52 are mounted on the top of channel wall members 31 and 35 respectively and are arranged to bear against the outer end portions of drum 11 and to direct oil scraped from the drum ends into channels 30 and 34. Likewise, blades 53 and 54 are mounted on the top of channel wall members 36 and 33 respectively and are adapted to direct oil scraped from the ends of drum 12 into channels 34 and 32.

Figure 4:
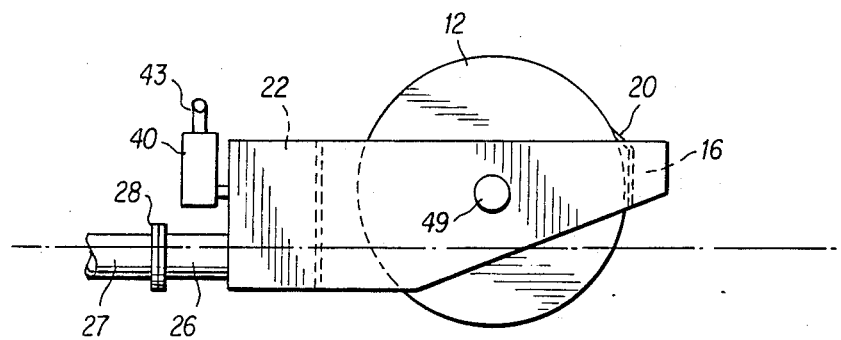
FIG. 4 is a side elevational view of the skimmer device of FIG. 1.

Referring now to FIG. 4, there is depicted a side view of the skimmer device of this invention as it is deployed in water. As can be appreciated from this view, the skimmer is supported by two separate areas of buoyancy; one being the reservoir trough 22 and the other being the two drums 11 and 12. Because of the arrangement whereby the two drums are pivotally mounted to the skimmer frame, at journal points 47 and 49, the depth to which the drums ride in the water is essentially independent of the fluid load or level in reservoir trough 22. Instead, the draft of the two drums is primarily determined by the size of the drums and the combined weight of the drums and the forward structure of the skimmer device and is essentially constant. Also clear in this view is the spatial relationship between the collection trough 16 and the reservoir trough 22. When the skimmer is deployed in water, the bottom of trough 16 rides well above the water surface and the bottoms of channels 30, 32, and 34 slope backwardly to their intersection with the bottom of trough 22. Thus, oil scraped from the drums into trough 16 runs rapidly back into the reservoir trough.

As has been set out earlier, one of the great practical benefits of the skimmer of this invention is its ability to operate in and reject floating trash while at the same time achieving oil recovery rates substantially higher than those obtained with skimmers of conventional design. In one preferred embodiment of this invention, the skimmer device is sized such that it can be carried and deployed in water by one person. An exemplary design conforming to those criteria had an overall width of 48 inches, a front-to-back dimension of 34 inches with two 18 inch diameter drums each 18 inches in length. That particular version weighed in at under 50 pounds including the motor and gear reducer and could be easily carried and maneuvered in water by one person. The drums drew less than 3 inches of water when the skimmer was deployed for operation and the skimmer was successfully operated in marsh grass and swamp environments having water depths as shallow as 3 inches.

It is particularly advantageous in the recovery of spilled oil using the skimmer of this invention to first treat the spilled oil to render it viscoelastic. That may be accomplished by dissolving a small amount, ranging from less than a hundred to a few thousand parts per million, of a high molecular weight polymer in the spilled oil in the manner described in a patent to O'Mara et al., U.S. Pat. No. 4,758,354. The polymer may be applied to the surface of the oil as droplets of a relatively concentrated polymer solution or may be applied to the oil in the form of solid particulates formulated in a manner which maintains the polymer in a rapid dissolving state. The preparation of such solid particulate polymer compositions is described in U.S. Pat. No. 4,720,397 and such compositions formulated for use with oil spills are commercially available under the trademark Elastol.

The previously described skimmer was tested in a number of different environments with a number of different oils. In one test, conducted for the purpose of measuring skimming rate, a 39 API gravity crude oil was poured into a test tank. A sufficient amount of the commercially available polymer formulation was added to the crude oil to provide a polymer concentration in the oil of 2,000 ppm. The skimmer was placed in the tank and was operated at different speeds to determine the maximum skimming rate obtainable without also picking up water. As much as 40 gallons of oil per minute were recovered by the skimmer. Other tests with heavier oils achieved oil pickup rates as high as 60 gallons per minute.

That same skimmer was used to clean up an accidental spill of a light crude oil into a ditch along a roadway in an oil field. The ditch bottom was covered with growing grasses and reeds and was laden with trash ranging from leaves and twigs to paper goods. It is the present conventional approach to the clean-up of a spill of the type described to suction up as much oil as possible using a vacuum truck and to use absorbent pads and mats to soak up the remaining oil and to carry it away. Vacuum nozzles are readily plugged by trash much in the same manner as is a home vacuum cleaner used to pick up leaves or paper. The use of absorbent pads requires an enormous amount of hand labor and creates in turn another disposal problem.

In this instance, the oil was treated with a small amount of polymer after which it was flushed out of the grass and reeds and into a ponding area within the roadside ditch using fire hoses. Oil cleaned up well out of the vegetation and was transported by water flow to the ponding area without discernible emulsion formation. The oil skimmer was placed in the ponded, oil-covered water in a water depth of about 3 to 4 inches and the reservoir trough of the skimmer was connected to a vacuum truck using a flexible, 3-inch diameter hose. The hose was also used to maneuver the skimmer and change its position on the ponded water. The air motor on the skimmer was supplied by a compressor on the vacuum truck. A substantially complete recovery of the spilled oil was obtained without water pickup and without plugging of the skimmer by trash.

Although this invention has been described with a certain degree of particularity, it is to be understood that the disclosure is by way of example and that changes in the details of construction and arrangement of certain parts may be made without departing from the invention. It is also to be appreciated that use of the skimmer device is not limited to spilled oils but that it may also find use in any circumstance where a liquid hydrocarbon is separated from water.

We claim:

1. A device for removing oil from the surface of water comprising:
   a frame of generally rectangular shape having a front, a back, and two sides;
   two drums of equal diameter spaced apart from one another along a common axis and arranged to rotate in the same direction, said axis parallel to the front of said frame;
   a collection trough forming the front of said frame and extending the full length of both said drums;
   a reservoir trough extending parallel to the axis of said drums but spaced apart from the drum surfaces, said reservoir trough forming the back of said frame, said drums and said reservoir trough proportioned and arranged to provide all of the buoyancy necessary to float said device on water in an oil-removing attitude;
   blade means bearing against the surface of both said drums and arranged to direct oil from said drum surfaces into said collection trough;
   motive means arranged to drive said drums in a direction whereby oil floating on water is drawn backwardly beneath the drums;
   channel means extending between said collection trough and said reservoir trough; and
   means to remove fluid from said reservoir trough.

2. The device of claim 1 wherein said motive means comprise a gear reducer positioned in the space between said drums, said gear reducer arranged to turn both drums at the same speed and in the same direction, said gear reducer driven by a mechanically coupled motor.

3. The device of claim 2 wherein said motor is an air motor positioned at the center of said back frame member.

4. The device of claim 1 wherein one of said channel means is located between the outside end of one said drum and the adjacent frame side and another of said channel means is located between the outside end of the other drum and the other frame side.

5. The device of claim 4 wherein a third channel means is located between the two drums.

6. The device of claim 5 including blade means bearing against the outer end surfaces of each of said drums and adapted to direct oil scraped from said drum surfaces into said channel means.

7. The device of claim 1 wherein said reservoir trough is flat-bottomed and wherein said means to remove fluid therefrom comprises a nipple communicating with the trough interior at a central point adjacent the trough bottom.

8. The device of claim 7 wherein said nipple terminates in a coupling means adapted for connection to a vacuum line.

9. The device of claim 1 wherein the bottom of said collection trough is connected and arranged to be at an elevated position above the surface of water when the device is deployed for operation.

10. The device of claim 1 wherein each said drum comprises a hollow, closed cylinder and wherein the two drums are of equal length.

11. The device of claim 10 wherein said drums are constructed of a polyolefin.

12. The device of claim 10 wherein said drums are sized such that they do not draw more than three inches of water when the device is deployed for operation.

* * * * *

UNITED STATES PATENT AND TRADEMARK OFFICE
CERTIFICATE OF CORRECTION

PATENT NO. : 4,957,636

DATED : September 18, 1990

INVENTOR(S) : Donald L. Wilson, et al.

It is certified that error appears in the above-identified patent and that said Letters Patent is hereby corrected as shown below:

In column 3, at line 5, "connected" should read "constructed".

Signed and Sealed this

Twenty-fourth Day of December, 1991

Attest:

HARRY F. MANBECK, JR.

Attesting Officer        Commissioner of Patents and Trademarks